(12) United States Patent
Daniel

(10) Patent No.: US 6,926,305 B2
(45) Date of Patent: Aug. 9, 2005

(54) AIR, ELECTRIC AND HYDRAULIC LANDING GEAR JACK

(76) Inventor: Jeffrey Daniel, 2476 Bolsover, #454, Houston, TX (US) 77005

( * ) Notice: Subject to any disclaimer, the term of this patent is extended or adjusted under 35 U.S.C. 154(b) by 21 days.

(21) Appl. No.: 10/142,579

(22) Filed: May 10, 2002

(65) Prior Publication Data
US 2003/0209896 A1 Nov. 13, 2003

(51) Int. Cl.[7] .................................................. B60S 9/02
(52) U.S. Cl. ............................ 280/766.1; 280/763.1; 254/419; 254/425
(58) Field of Search ............................ 280/766.1, 765.1, 280/763.1, 6.153, 6.155, 6.156; 180/41; 254/418, 419, 420, 424, 425; 74/425

(56) References Cited

U.S. PATENT DOCUMENTS

| | | | |
|---|---|---|---|
| 3,632,086 A | * 1/1972 | Mai | 254/419 |
| 3,729,212 A | * 4/1973 | Claflin et al. | 280/766.1 |
| 3,784,160 A | * 1/1974 | Phillips | 254/425 |
| 3,919,899 A | * 11/1975 | Parker, Jr. | 475/228 |
| 3,921,958 A | * 11/1975 | Brockelsby et al. | 254/420 |
| 3,976,310 A | 8/1976 | Carr | 280/766 |
| 4,097,840 A | 6/1978 | Chappelle | 340/52 |
| 4,187,733 A | 2/1980 | Walther et al. | 74/342 |
| 4,318,550 A | * 3/1982 | Jacobsen | 280/766.1 |
| 4,345,779 A | * 8/1982 | Busby | 280/766.1 |
| 4,400,986 A | 8/1983 | Swanson et al. | 74/128 |
| 4,402,526 A | 9/1983 | Huetsch | 280/766.1 |
| 4,466,637 A | * 8/1984 | Nelson | 280/766.1 |
| 4,928,488 A | * 5/1990 | Hunger | 60/480 |
| 5,004,267 A | * 4/1991 | Busby | 280/766.1 |
| 5,050,845 A | * 9/1991 | Aline et al. | 254/419 |
| 5,100,105 A | * 3/1992 | Schneider et al. | 254/93 H |
| 5,199,738 A | * 4/1993 | VanDenberg | 280/766.1 |
| 5,238,266 A | * 8/1993 | VanDenberg | 280/766.1 |
| 5,299,829 A | 4/1994 | Rivers, Jr. et al. | 280/766.1 |
| 5,409,251 A | * 4/1995 | Thorndyke | 280/475 |
| 5,421,555 A | * 6/1995 | Sims | 254/420 |
| 5,423,518 A | * 6/1995 | Baxter et al. | 254/419 |
| 5,426,961 A | * 6/1995 | Rimbaud et al. | 70/237 |
| 5,451,076 A | * 9/1995 | Burkhead | 280/766.1 |
| 5,509,687 A | 4/1996 | Thorndike | 280/766.1 |
| 5,538,225 A | * 7/1996 | VanDenberg | 254/419 |
| 5,904,342 A | * 5/1999 | Laarman | 254/419 |
| 5,911,437 A | 6/1999 | Lawrence | 280/766.1 |
| 6,010,154 A | 1/2000 | Payne et al. | 280/766.1 |
| 6,086,099 A | 7/2000 | Kingsbury | 280/766.1 |
| 6,099,016 A | * 8/2000 | Peveler | 280/475 |
| 6,141,997 A | * 11/2000 | Blehi, III | 70/56 |
| 6,224,103 B1 | 5/2001 | Hatcher | 280/766.1 |
| 6,260,882 B1 | 7/2001 | Kingsbury | 280/766.1 |
| 6,446,937 B1 | * 9/2002 | Straw et al. | 254/425 |
| 6,598,886 B2 | * 7/2003 | Baird et al. | 280/6.155 |
| 6,623,035 B1 | * 9/2003 | Schneider | 280/766.1 |

* cited by examiner

Primary Examiner—Christopher P. Ellis
Assistant Examiner—Jeff Restifo
(74) Attorney, Agent, or Firm—Jackson Walker L.L.P.; Mark A. Tidwell, Esq.

(57) ABSTRACT

A trailer landing gear drive system in which pneumatic, hydraulic and electric motors, as well as the traditional hand crank, are easily interchangeable. The landing gear jack mechanism is disposed to easily connect to any one of these drive motors. The system can utilize any one of the three motor combinations without making any change to the jack itself. Each drive motor output shaft is keyed to connect to the input shaft driving the worm gear of the jack. The output shaft of each type of motor is keyed the same so that the motors are swappable with respect to the input shaft of the landing gear. The hand crank shaft is also keyed to be the same as the keyed motor output shafts. Each motor may include a flange to permit it to be secured to the landing gear. The system eliminates the gear reduction box and replaced it with a worm gear. Furthermore, the system can be operated remotely so that the operator need not be exposed to the perils of weather, a shifting load, other vehicles in the vicinity or other similar hazards.

12 Claims, 2 Drawing Sheets

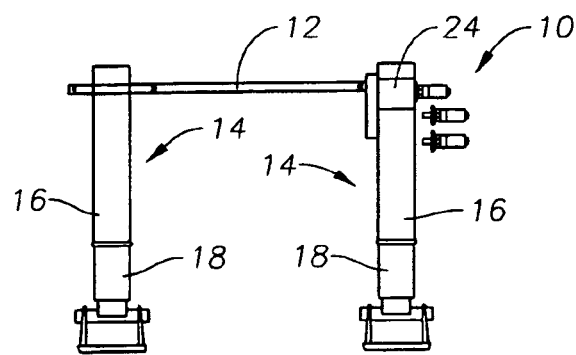
Fig. 1
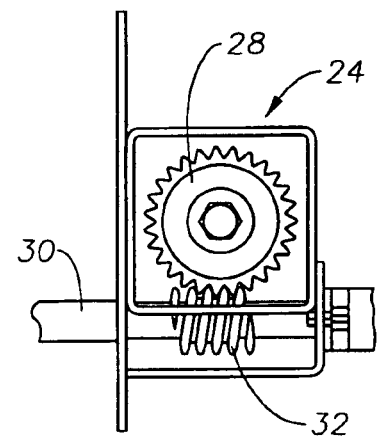
Fig. 2
Fig. 3
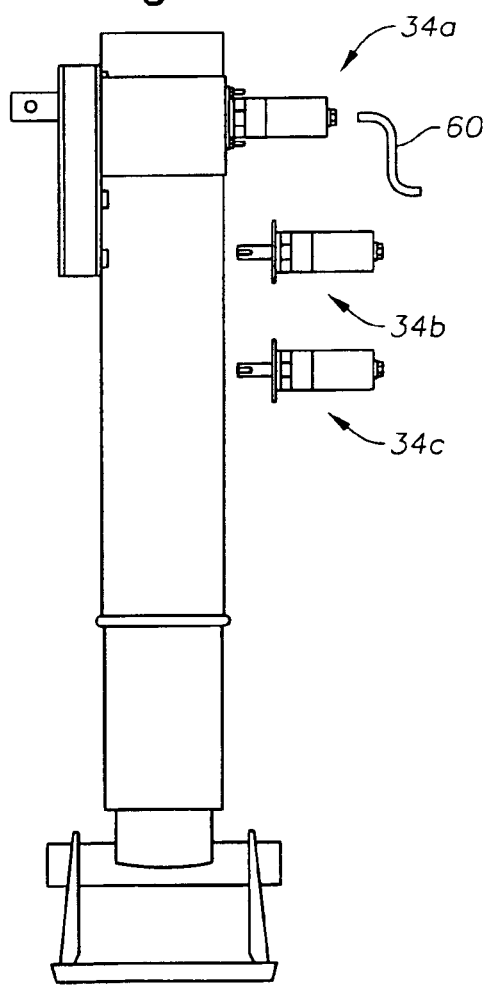
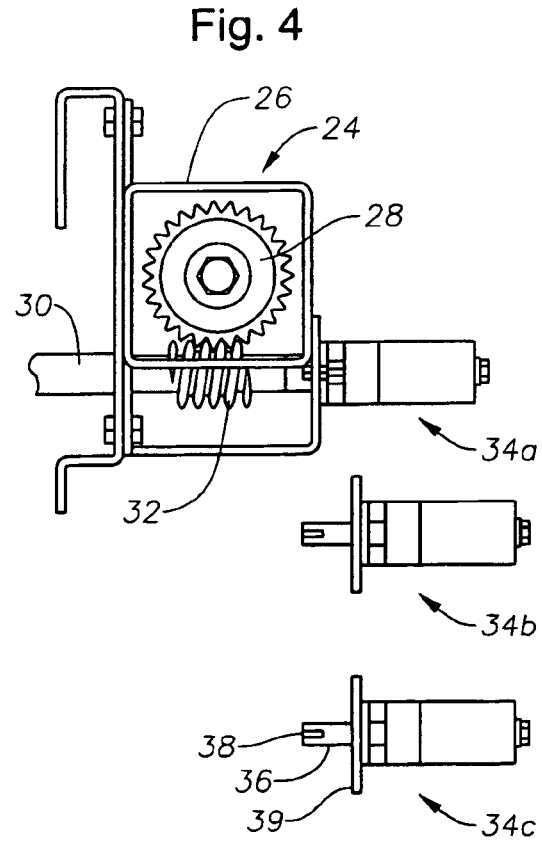
Fig. 4

Fig. 5
Fig. 6
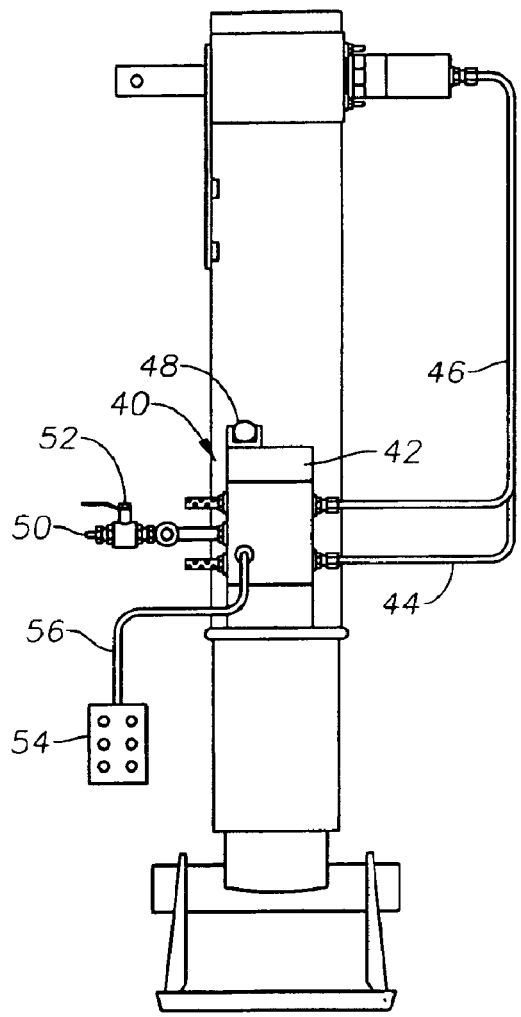
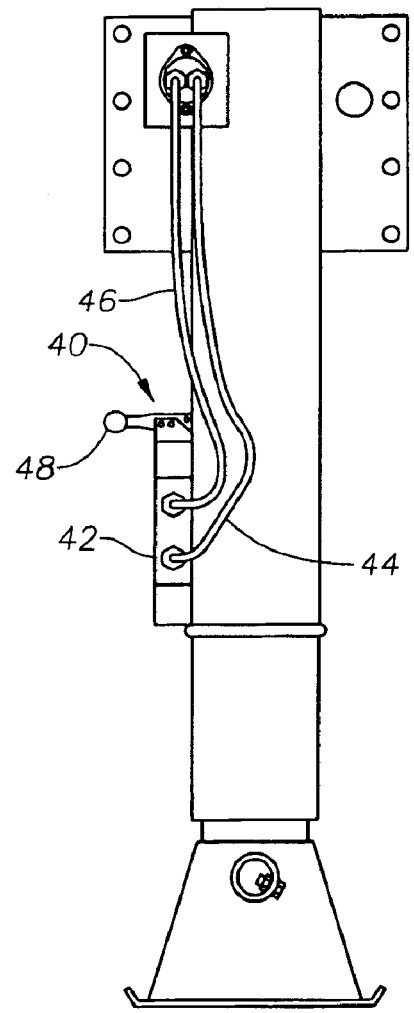

AIR, ELECTRIC AND HYDRAULIC LANDING GEAR JACK

BACKGROUND OF THE INVENTION

1. Field of the Invention

The present invention relates to semi-trailer landing gear extension and retraction mechanisms, and more particularly to a landing gear mechanism that can be actuated by inexpensive, easily interchangeable pneumatic, hydraulic and electric motors as well as the traditional hand crank.

2. Description of the Prior Art

Many semi-trailers have front landing gear for support of the front of the trailer when the tractor is detached. Such landing gears generally have two spaced-apart, telescoping or Jack-type landing gear legs and feet which extend downwardly from the floor of the trailer. Each leg is operatively attached to screw and follower or a rack and pinion gear arrangement which is driven by a landing gear drive shaft which extends between the legs and which causes extension or retraction of the legs and feet depending on the direction in which it is rotated.

Traditionally, a hand operable handle or crank is attached to the landing gear drive shaft by a pin or bolt which serves as a hinge connection allowing the handle to be pivoted out of the way while not in use. Manual rotation of the handle in one direction causes extension of the feet and lifting of the trailer to, for example, separate the trailer from a semi-tractor, and requires considerable time and effort on the part of the person manually rotating the hand crank. Manually operated jack structures, however, are often difficult to use, require much time for their operation and expose the operator to potential injuries as he is positioned next to the trailer while turning the crank to raise or lower the landing gear to in turn raise or lower the trailer.

Thus, prior art attempts have been made to reduce the effort required to manually operate the crank handle. For example, a two-speed gear box, referred to as a gear reduction box, is typically included in the prior art landing gear to allow the hand crank handle to be attached to either a high speed or low speed input shaft of the gear box. The gear ratio utilized within the gear reduction box assembly depends upon the lateral positioning of the crank shaft and the outer diameter of the spur gears utilized in the gear box. In any event, the primary type of gear utilized in these gear boxes, as well as to transfer crank handle input power to the gear boxes, is the basic spur gear. While other types of gear configurations, such as worm gears, have been used in gear boxes, they have not been incorporated into the gearing of landing gear assemblies because of the need to incorporate gear reduction boxes within the assembly. To the extent a gear reduction box is included in a landing gear assembly, other types of gears, such as worm gears, are not utilized because they would simply distort or slow down the input speed of the crank handle. In other words, worm gears in combination with gear reduction boxes would reduce the effectiveness of the gear reduction boxes by altering the two speeds of the gear box.

Another attempt in the prior art to reduce operator input effort has been to retrofit existing landing gear with powered devices in order to raise and lower the landing gear. Generally, such retrofitted devices require an intricate system of spacers, pulleys and gearing that is both comparatively expensive and difficult to implement. This is especially true since the powered devices must be retrofitted to operate with gear reduction boxes. In any event, most of these powered devices have been pneumatically powered, although other power means have been used for the purpose. Typically, even beyond the general retrofit system, such pneumatic devices require a complex system to receive pressurized air for the actuators to rotate the crank shaft of the gear reduction assembly to raise and lower the landing gear. One class of prior art pneumatic devices has utilized pneumatic impact motors to drive the landing gear. Of course, those skilled in the art will understand that due to their pulsating drive mechanism, such pneumatic impact motors are not conducive to the desired smooth operation of raising and lowering the landing gear legs, especially in combination with gear reduction boxes. Another class of prior art pneumatic mechanisms dispenses with the gearing system of traditional landing gear and utilizes a pneumatic bladder to telescope the landing gear legs. Whichever type of pneumatic actuation system is used, however, such devices generally are permanently retrofitted as an integrated part of the reduction box and drive system of the landing gear.

Piston driven hydraulic devices are also known in the prior art. Similar to the pneumatic air bladder system referenced above, such devices replace traditional gearing systems and utilize hydraulic pistons to drive the landing gear. Once drawback to hydraulic pistons is that they do not provide the same positive holding as provided by a gearing arrangement. Power failure or loss of pressure could cause failure and collapse of the landing gear. In any event, such systems are generally large, cumbersome and permanently installed as an integrated part of the drive system.

Still yet other drive mechanisms have focused on the use of electric motors. The desirability of electric motors for powering landing gear is that they are generally easy to operate and require a less complicated motor control system. As with other types of motors, however, electric motors usually require specialized parts to link the motor to the gear mechanism and the motors are installed as an integral, permanent component of the landing gear system.

Because of the complexity and expense of prior art motor driven systems for raising and lowering landing gear, such systems have not been widely accepted in the trucking industry and old fashioned, hand crank systems still predominate in the field. Also because of the prior art's complexity and need for specialized parts, many of these motor driven systems have proven to be fragile and generally unsuitable to the rugged demands of long-haul semi-trailers in use on a daily basis.

Another drawback to the prior art is that manual operation of landing gear requires the operator to be in close proximity to the loaded trailer. As such, any shift in load or failure of the landing gear would put the operator in peril. Furthermore, in typical trailer arrangements, the operator must stand on the side of the trailer, near the front of the trailer, to operate the landing gear. In doing so, the operator may be exposed to traffic or other vehicles moving along side the trailer. This is especially dangerous for the operator when the trailer may be pulled off the road onto a road shoulder and the operator is forced to stand at the edge of the road to operate the crank handle. Finally, such manual operation subjects the operator to exposure to the weather, a prospect that can be unpleasant at best during rain, snow or hot weather and could exacerbate the other safety issues identified herein.

Each of the various types of prior art motor mechanisms for driving landing gear have there benefits and drawbacks. It would therefore be desirable to provide a motor driven landing gear system that takes advantage of each of the pneumatic, hydraulic and electric motor driven systems while avoiding the traditional drawbacks of these systems.

SUMMARY OF THE INVENTION

Accordingly, it is an object of the present invention to provide a landing gear actuating system which can selectively incorporate any of the various types of motors utilized to drive a landing gear mechanism.

It is another object of the present invention to provide a landing gear system that is disposed to permit the easy interchange of pneumatic, hydraulic and electric motors in a single system.

It is another object of the present invention to provide a system which is reliable in operation.

It is another object of the present invention to eliminate the need for a gear reduction box in landing gear systems.

It is another object of the present invention to provide a landing gear system that is safe to operate.

It is another object of the present invention to provide a landing gear system that can be operated remotely.

It is another object of the present invention to provide a landing gear actuating system which is inexpensive to manufacture.

It is yet another object of the present invention to provide a landing gear actuating system which is easy to use.

It is still another object of the present invention to provide a landing gear actuating system which is safe to use.

It is yet another object of the present invention to provide a landing gear actuating system which can be selectively left attached to a trailer during transport thereof or else can be readily detached to interchange the type of motor used to actuate the landing gear system.

Briefly, the preferred embodiment of the present invention is a landing gear mechanism disposed to easily connect to any one of a hydraulic, pneumatic or electric motor. The system can utilize any one of the three motor combinations without making any change to the jack itself. Rather, each motor output shaft is keyed to connect to the input shaft driving the worm gear of the jack. In this regard, the output shaft of each type of motor is keyed the same so that the motors are swappable with respect to the input shaft of the landing gear. The motor may include a flange to permit it to be secured to the landing gear so as not to rotate on the output shaft when the motor is actuated. The system eliminates the gear reduction box and replaces it with a worm gear. Furthermore, the system can be operated remotely so that the operator need not be exposed to the perils of weather, a shifting load, other vehicles in the vicinity or other similar hazards.

BRIEF DESCRIPTION OF THE DRAWINGS

FIG. 1 illustrates a typical set of landing gear for a semi-trailer.

FIG. 2 is a cut away view of the worm gear drive mechanism of the landing gear illustrated in FIG. 1

FIG. 3 illustrates a preferred embodiment of the invention in which one of three different types of motors can be attached to actuate the worm gear drive mechanism of FIG. 2.

FIG. 4 illustrates a cut away view of the system of the invention in which the worm gear drive mechanism is attached to a pneumatic driven motor.

FIG. 5 is a side view of the system of the invention illustrating the controls for the motor driven landing gear.

FIG. 6 is a front view of the system of the invention illustrating the controls for the motor driven landing gear.

DESCRIPTION OF THE PREFERRED EMBODIMENTS

FIG. 1 depicts a conventional landing gear assembly 10. As can be seen in the view of FIG. 1, the landing gear 10 has a drive shaft 12 which passes through the upper ends of a pair of telescoping legs 14. Each leg 14 has an outer tubular body 16 in which an inner tubular portion 18 is telescopically received. Pivotally mounted feet, wheels or pads 20 attach to the distal end of each inner tubular portion 18. Conventional gear mechanisms (not shown) cause the inner tubular portion 18 to raise or lower, depending upon the direction of rotation of the drive shaft 12. It should be noted that the landing gear need not include a gear reduction box as is common in prior art landing gear configurations.

Attached to drive shaft 12 is worm gear drive 24. As illustrated in FIG. 2, worm gear drive 24 includes a outer box 26 in which is pivotally mounted a spur gear 28. Also pivotally mounted within box 26 is an input shaft 30 which is provided with a threaded portion 32 that engages gear 28. Gear 28 is attached to a transfer shaft (not shown) which itself is engaged with drive shaft 12 so that rotation of gear 28 results in rotation of the transfer shaft which thereby results in actuation of the telescoping gear mechanisms within leg 14.

With reference to FIG. 3, a drive motor 34 is shown attached to landing gear 10. As shown, landing gear 10 and drive motor 34 are disposed such that drive motor 34 can be powered by various types of input energy. Specifically, there is shown a pneumatic drive motor 34a attached go landing gear 10, as well as an electric drive motor 34b and a hydraulic drive motor 34c. Drive motors 34a, 34b and 34c are disposed to be interchangeable with one another, thus permitting an operator of landing gear 10 to select the input motor most appropriate for the input energy source available.

FIG. 4 illustrates drive motor 34 attached to worm gear drive 24. Each drive motor 34 includes an output shaft 36 and a mounting flange 38. Output shaft 36 is provided with a slot, key or similar coupling mechanism 38 in order to permit attachment to input shaft 30 of worm gear drive 24. In the preferred embodiment, slot 38 permits easy coupling and decoupling of output shaft 36 with input shaft 30 so that motors 34a, 34b and 34c can be easily interchanged depending on the particular power source available for motor 34. Mounting flange 39 permits external attachment of motor 34 to outer box 26, thus preventing motor 34 from rotating on output shaft 36 when motor 34 is actuated.

In the preferred embodiment, the gear reduction box of the prior art is not included because the presence of motor 34 obviates the need for such a mechanism. As explained above, gear reduction boxes are utilized to assist manual operation of landing gear by reducing an operator's effort. Since a motor 34, rather than an operator, is actuating the landing gear of the invention, it is not necessary to include the traditional gear reduction box. As such, the overall landing gear mechanism is simplified.

One benefit of the gear reduction boxes of the prior art is their safety benefit. Because of the spur gear ratios involved, gear reduction boxes are beneficial because they will not spin out of control, often referred to as "free-wheeling", under collapse of the landing gear. Rather, any collapse of the landing gear is intended to be gradual as the movement of the landing gear is passed through the gear reduction box.

Because gear reduction boxes are not utilized in the present invention, this safety function is addressed by virtue of worm gear 24. In the same fashion that a gear reduction box will not spin out of control under a collapse of the landing gear, the worm gear 24 used in the present invention also has this function. In fact, since the worm gear is not relying on spur gears to the same extent as gear reduction boxes, the possibility of failure of the spur gears is diminished, resulting in enhanced safety benefits in the worm gear. Thus, the elimination of the gear reduction box from the present invention does not eliminate the safety benefits that the gear reduction boxes of the prior art provided, and the presence of the worm gear functions as a built in braking system for the landing gear.

In this same vein, an additional drawback of gear reduction boxes utilized in landing gear is that such boxes generally have a maximum weight capacity due primarily to the utilization of spur gears with the prior art devices. Those skilled in the art will understand that the maximum weight capacity of worm gears is typically higher than spur gears, and as such, the invention of the prior art is beneficial because it can handle higher weight capacities than the landing gear of the prior art.

FIGS. 5 and 6 illustrate one type of control mechanism 40 for a fluid powered motor 34. Control mechanism 40 includes a control box 42 with internal valving (not shown) to permit a fluid (not shown) to be passed either through a first fluid line 44 or a second fluid line 46. Selection between first fluid line 44 and second fluid line 46 is regulated by control lever 48 and can be used to drive the speed of motor 34 as well as the direction of motor 34, i.e., forward or reverse. Also shown attached to control box 42 is a fluid supply line 50 and a fluid supply line control valve 52. Fluid supply line 50 is attached to a fluid reservoir (not shown) to supply the fluid to control mechanism 40. Those skilled in the art will understand that the specific configuration of control mechanism 40 will depend on the type of fluid (pneumatic or hydraulic) and the parameters of operation. Furthermore, while an electric control mechanism is not shown, those skilled in the art will understand that an electric motor 34b can be controlled my any standard electric control mechanism.

One benefit of the invention of the preferred embodiment is that not only can motors 34 be easily interchanged to drive landing gear 10, but a traditional crank handle 60 (FIG. 3) may also be readily attached to input shaft 30 to permit manual operation of landing gear 10. Specifically, the crank handle is provided with the same coupling mechanism 38 as motors 34 to allow attachment of the handle to input shaft 30. This may be especially desirable in instances of power source interruption.

As described herein, landing gear 10 is provided with three motor combinations that can be selected, based on the available power source, convenience and economics, without the need for complex drive systems or alterations to landing gear 10. Rather, each motor can simply and readily be bolted or otherwise secured onto landing gear 10 through a common commercially accepted key or attachment mechanism. In an alternative embodiment, rather than removing motor 34 in order to utilize a manual crank handle 60, the crank handle 60 can be attached to motor 34. Specifically motor 34 may be provided with a second coupling mechanism 38 to permit the crank handle to be attached to motor 34 and utilized to manually rotate output shaft 36 of motor 34.

Another benefit of the invention is illustrated in FIG. 5. Control mechanism 40 is illustrated as attached adjacent landing gear 10. However, rather than utilizing control mechanism 40 to operate motor 34, a remote operation device 54 may be utilized for this purpose. Most commonly, remote operation device 54 will be used in conjunction with an electric motor 34b, but may also be utilized to control fluid driven motors. In any event, remote operation device 54 is preferably attached either directly to motor 34 or to a control mechanism 40 by a tether 56, which may consist of wiring, tubing or the like, as necessary to control the particular motor in use. Tether 56 allows the operator to distance himself or herself from the trailer. As such, the operator is much less likely to be subjected to various environmental dangers such as the weather, a shift in trailer load or passing vehicles. In one embodiment, remote operation device 54 can be utilized while the operator remains in the cab of the truck.

In the preferred embodiment, the landing gear can be operated by use of either an pneumatic, electric or hydraulic motor to raise and lower the landing gear under load at commercially accepted trailer capacity. Of course, those skilled in the art will understand that the individual jacks 11 of landing gear 10 are shown and operable in tandem, but that the swappable motor system of the invention could also be utilized to control jacks 11 individually. The invention is particularly desirable because it has been observed that landing gear retrofitted with a drive motor not only lack the capability of easily swapping different types of drive motors, but also that such re-worked landing gear generally do not have the lift capacity required of a full trailer.

Furthermore, while various types of gearing mechanisms may be used to transfer power from motor 34 to actuation of jacks 11 without departing from the invention, the use of a worm gear as described herein is desirable because the worm gear is inherently safer because of it can function as a braking system for the landing gear, thus inhibiting "freewheeling" of the landing gear set by virtue of downward weight or pressure exerted thereon.

What is claimed is:

1. A trailer landing gear lifting device for actuating the landing gear of a trailer, said lifting device comprising,
   a. a first jack, said jack comprising a first tubular body in which a second tubular body is telescopically mounted and a power transfer drive gear mechanism for telescoping said second tubular body within said first tubular body;
   b. a second jack, said second jack comprising a first tubular body in which a second tubular body is telescopically mounted and a gear mechanism for telescoping said second tubular body within said first tubular body;
   c. a drive shaft connecting said power transfer drive gear mechanism of said first jack with said gear mechanism of said second jack, such that actuation of said power transfer drive gear mechanism of said first jack results in actuation of said gear mechanism of said second jack;
   d. a worm gear set engaged with said power transfer drive gear mechanism of said first jack;
   e. an input shaft rotatingly connected to said worm gear set to actuate said worm gear set upon rotation of said input shaft, said input shaft provided with a first coupler; and
   f. a removable first motor operable by a first input, said first motor having an output shaft provided with a second coupler, wherein said second coupler is disposed to engage the first coupler of said input shaft.

2. The landing gear lifting device of claim 1, wherein said worm gear set comprises said power transfer drive gear mechanism of said first jack.

3. The landing gear lifting device of claim 1, further comprising a removable second motor operable by a second input different from the first input of said first motor, said second motor having an output shaft provided with a second coupler, wherein said second coupler is disposed to engage the first coupler of said input shaft.

4. The landing gear lifting device of claim 3, wherein the first input of said first motor is electric and the second input of said second motor is pneumatic.

5. The landing gear lifting device of claim 3, wherein the first input of said first motor is electric and the second input of said second motor is hydraulic.

6. The lifting device of claim 1, wherein said worm gear set comprises
   a. a worm gear shaft;
   b. a spur gear mounted on said worm gear shaft, said spur gear engageable by said power transfer drive gear mechanism; and
   c. an input shaft having threads disposed along said input shaft, said spur gear engageable by said input shaft threads to transfer power from said first motor to said first jack.

7. A trailer landing gear lifting device for actuating the landing gear of a trailer, said lifting device comprising,
   a. a first jack, said jack comprising a first tubular body in which a second tubular body is telescopically mounted and a power transfer drive gear mechanism for telescoping said second tubular body within said first tubular body;
   b. a second jack, said second jack comprising a first tubular body in which a second tubular body is telescopically mounted and a gear mechanism for telescoping said second tubular body within said first tubular body;
   c. a drive shaft connecting said power transfer drive gear mechanism of said first jack with said gear mechanism of said second jack, such that actuation of said power transfer drive gear mechanism of said first jack results in actuation of said gear mechanism of said second jack;
   d. a worm gear shaft engaged with said power transfer drive gear mechanism of said first jack, said worm gear shaft having a spur gear mounted thereon;
   e. an input shaft having threads disposed thereon, wherein said threads of said input shaft engage the spur gear of said worm gear shaft, said input shaft further provided with a first coupler; and
   f. a removable first motor operable by a first input, said first motor having an output shaft provided with a second coupler, wherein said second coupler is disposed to engage the first coupler of said input shaft.

8. The landing gear lifting device of claim 7, wherein said drive shaft is connected directly to the power transfer drive gear mechanism.

9. The landing gear lifting device of claim 7, further comprising a removable second motor operable by a second input different from the first input of said first motor, said second motor having an output shaft provided with a second coupler, wherein said second coupler is disposed to engage the first coupler of said input shaft.

10. The landing gear lifting device of claim 9, wherein the first input of said first motor is electric and the second input of said second motor is pneumatic.

11. The landing gear lifting device of claim 9, wherein the first input of said first motor is electric and the second input of said second motor is hydraulic.

12. A trailer landing gear lifting device for actuating the landing gear of a trailer, said lifting device comprising,
   a. a first jack, said jack comprising a first tubular body in which a second tubular body is telescopically mounted and a power transfer drive gear mechanism for telescoping said second tubular body within said first tubular body;
   b. a second jack, said second jack comprising a first tubular body in which a second tubular body is telescopically mounted and a gear mechanism for telescoping said second tubular body within said first tubular body;
   c. a drive shaft rotatingly connecting said power transfer drive gear mechanism of said first jack with said gear mechanism of said second jack, such that actuation of said power transfer drive gear mechanism of said first jack results in actuation of said gear mechanism of said second jack;
   d. a worm gear mechanism engaged with said power transfer drive gear mechanism of said first jack;
   e. an input shaft rotatingly connected to said worm gear mechanism to actuate said worm gear mechanism upon rotation of said input shaft, said input shaft provided with a first coupler; and
   f. a first motor operable by a first input, said first motor having an output shaft provided with a second coupler, wherein said second coupler is disposed to engage the first coupler of said input shaft.

* * * * *